US012643212B2

(12) United States Patent
Schneider et al.

(10) Patent No.: US 12,643,212 B2
(45) Date of Patent: Jun. 2, 2026

(54) DRIVE ASSEMBLY FOR A POWER TOOL

(71) Applicant: MILWAUKEE ELECTRIC TOOL CORPORATION, Brookfield, WI (US)

(72) Inventors: Jacob P. Schneider, Cedarburg, WI (US); Braden A. Roberts, Brookfield, WI (US); Troy C. Thorson, Cedarburg, WI (US); Evan Brown, Milwaukee, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 18/758,414

(22) Filed: Jun. 28, 2024

(65) Prior Publication Data

US 2025/0001572 A1 Jan. 2, 2025

Related U.S. Application Data

(60) Provisional application No. 63/511,362, filed on Jun. 30, 2023.

(51) Int. Cl.
*B25D 17/06* (2006.01)
*B25D 11/04* (2006.01)

(52) U.S. Cl.
CPC .............. *B25D 17/06* (2013.01); *B25D 11/04* (2013.01); *B25D 2217/0015* (2013.01); *B25D 2217/0023* (2013.01)

(58) Field of Classification Search
CPC .................... B25D 11/04; B25D 17/06; B25D 2217/0015; B25D 2217/0023
See application file for complete search history.

(56) References Cited

U.S. PATENT DOCUMENTS

| | | | | |
|---|---|---|---|---|
| 5,906,244 | A * | 5/1999 | Thompson | B25B 21/026 173/93.5 |
| 6,889,778 | B2 | 5/2005 | Colangelo, III et al. | |
| 8,505,648 | B2 * | 8/2013 | Elger | B25B 21/026 173/93.5 |
| 9,272,400 | B2 | 3/2016 | Johnson | |
| 9,486,908 | B2 | 11/2016 | Dougherty | |
| 9,555,532 | B2 * | 1/2017 | Amend | B25D 11/04 |
| 9,737,978 | B2 | 8/2017 | Golden et al. | |
| 10,427,277 | B2 * | 10/2019 | McClung | B25B 13/06 |
| 11,484,997 | B2 * | 11/2022 | Schneider | B25B 21/026 |
| 2010/0025063 | A1 | 2/2010 | Kuhnapfel et al. | |
| 2022/0040829 | A1 * | 2/2022 | Schneider | B25B 21/026 |

FOREIGN PATENT DOCUMENTS

| | | |
|---|---|---|
| DE | 20118029 U1 | 1/2002 |

* cited by examiner

*Primary Examiner* — Shelley M Self
*Assistant Examiner* — David G Shutty
(74) *Attorney, Agent, or Firm* — Michael Best & Friedrich LLP

(57) ABSTRACT

An anvil configured to be impacted by a hammer in an impact wrench. The anvil defines a rotational axis. The anvil includes an anvil lug having a driven surface engageable with the hammer. The driven surface includes an involute profile. The involute profile is formed by a base cylinder defining a central axis. The central axis is offset from the rotational axis of the anvil.

17 Claims, 11 Drawing Sheets

DRIVE ASSEMBLY FOR A POWER TOOL

CROSS-REFERENCE TO RELATED APPLICATION

This application claims priority to U.S. Provisional Patent Application No. 63/511,362, filed Jun. 30, 2023, the entire content of which is incorporated herein by reference.

FIELD

The present disclosure relates to tools, and more particularly to power tools.

BACKGROUND

Drive assemblies are typically employed in power tools (e.g., electrically-operated power tools, pneumatic power tools, etc.) to transfer torque from a motor to a tool element to perform work on a workpiece. Particularly, impact wrenches utilize drive assemblies to convert continuous rotational motion of an output shaft of the motor to a striking rotational force, or intermittent applications of torque, to the tool element and workpiece. As such, impact wrenches are typically used to loosen or remove stuck fasteners (e.g., an automobile lug nut on an axle stud) that are otherwise not removable or very difficult to remove using hand tools. Such drive assemblies typically include a hammer having at least one drive surface, and an anvil having at least one, typically flat driven surface oriented substantially normal to a longitudinal axis of the anvil.

The outer corner of the driven surface is typically rounded with a relatively small radius, providing a relatively sharp transition from the driven surface to an adjacent end surface of the anvil. With such a flat driven surface, imperfections in the form, size, and symmetry of the anvil may yield uneven contact between the hammer and the anvil during operation of the impact wrench, potentially reducing the efficiency of the impact wrench and/or accelerating wear between the hammer and the anvil.

Depending upon the size and configuration of the impact wrench, a relatively large amount of torque may be transferred through the drive assembly to the tool element and workpiece. As a result, relatively high contact stresses often occur at the outer corner of the driven surface during operation of the impact wrench.

SUMMARY

The disclosure provides, in one aspect, an anvil configured to be impacted by a hammer in an impact wrench. The anvil defines a rotational axis. The anvil includes an anvil lug including a driven surface engageable with the hammer. The driven surface includes an involute profile. The involute profile is formed by a base cylinder defining a central axis. The central axis is offset from the rotational axis of the anvil.

The disclosure provides, in another aspect, a hammer configured to impact an anvil in an impact wrench. The hammer defines a rotational axis. The hammer includes a body having an inner surface defining a hammer inner diameter and a hammer lug extending inwardly from the inner surface toward the rotational axis, the hammer lug including a drive surface engageable with the anvil, the drive surface including an involute profile. The involute profile is formed by a base cylinder defining a central axis, and the central axis is offset from the rotational axis of the hammer.

The disclosure provides, in another aspect, a drive assembly for use in an impact wrench, the drive assembly including a hammer configured to rotate about a rotational axis, the hammer including a body having an inner surface defining a hammer inner diameter and a hammer lug extending inwardly from the inner surface toward the rotational axis, and an anvil including an anvil lug, the anvil lug having a driven surface. The drive surface of the hammer is configured to strike the driven surface of the anvil to transmit torque to the anvil, the drive surface and the driven surface each include an involute profile formed by a base cylinder defining a base cylinder diameter, and the base cylinder diameter is greater than the hammer inner diameter.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
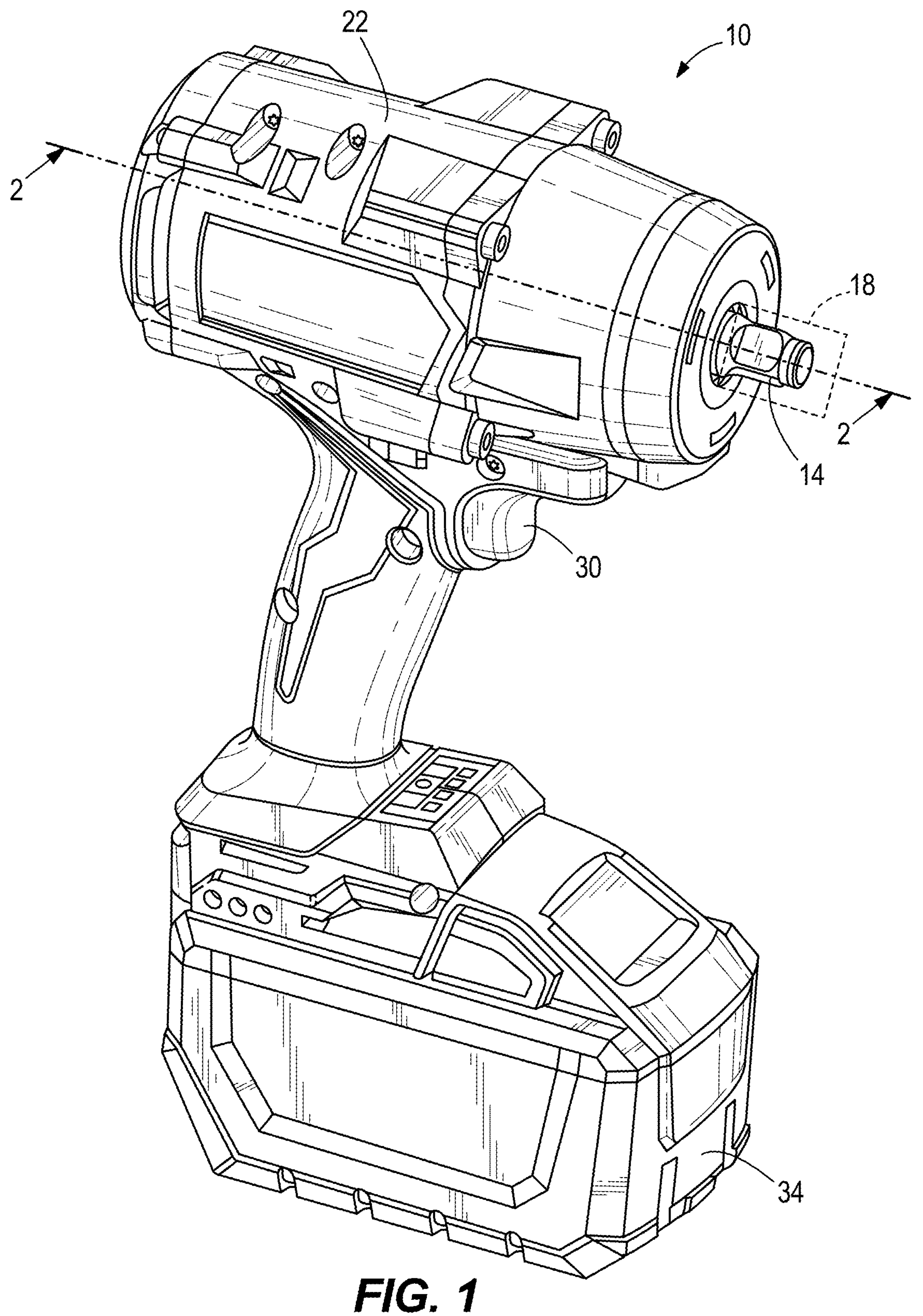
FIG. 1 is a perspective view of a power tool in which a drive assembly including a hammer and an anvil embodying aspects of the present disclosure may be implemented.
Figure 2:
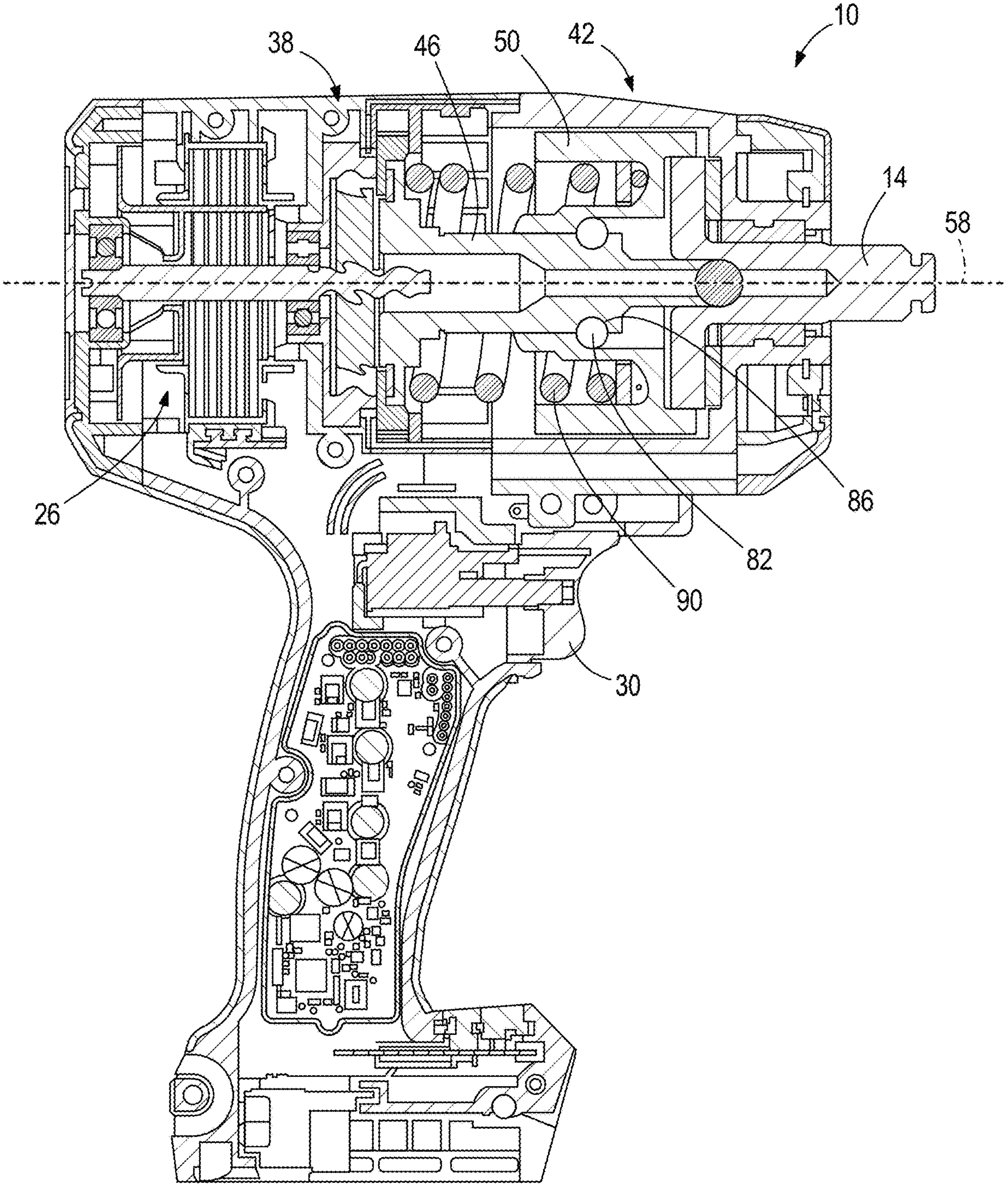
FIG. 2 is a cross-sectional view of the power tool taken along line 2-2 in FIG. 1, shown with a battery pack of the power tool removed.

FIG. 1 illustrates a power tool in the form of an impact wrench 10 including an anvil 14 and a tool element 18 coupled to the anvil 14. Although the tool element 18 is schematically illustrated, the tool element 18 may include a socket configured to engage the head of the fastener (e.g., a bolt). Alternatively, the tool element 18 may include any of a number of different configurations (e.g., an auger or a drill bit) to perform work on a workpiece. With reference to FIGS. 1 and 2, the impact wrench 10 includes a housing 22 and a reversible electric motor 26 coupled to the anvil 14 to provide torque to the anvil 14 and the tool element 18. The impact wrench 10 also includes a switch (e.g., trigger switch 30) supported by the housing 22. The illustrated impact wrench 10 includes a rechargeable battery 34. The motor 26 is configured to operate on DC power provided by the battery 34. In some embodiments, the impact wrench 10 may include a power cord extending from the housing 22 for electrically connecting the switch 30 and the motor 26 to a source of AC power. As a further alternative, the impact wrench 10 may be configured to operate using a different power source (e.g., a pneumatic or hydraulic power source, etc.) besides electricity.

With reference to FIG. 2, the impact wrench 10 also includes a gear assembly 38 coupled to an output of the motor 26 and a drive assembly 42 coupled to an output of the gear assembly 38. The gear assembly 38 may be configured in any of a number of different ways to provide a speed reduction between the output of the motor 26 and an input of the drive assembly 42. The drive assembly 42, of which the anvil 14 may be considered a component, is configured to convert the constant rotational force or torque provided by the gear assembly 38 to a striking rotational force or intermittent applications of torque to the tool element 18. In the illustrated embodiment of the impact wrench 10, the drive assembly 42 includes a camshaft 46 coupled to and driven by the gear assembly 38, a hammer 50 supported on and axially slidable relative to the camshaft 46, and the anvil 14. The hammer 50 and the anvil 14 each define and are rotatable about a rotational axis 58.

Figure 3:
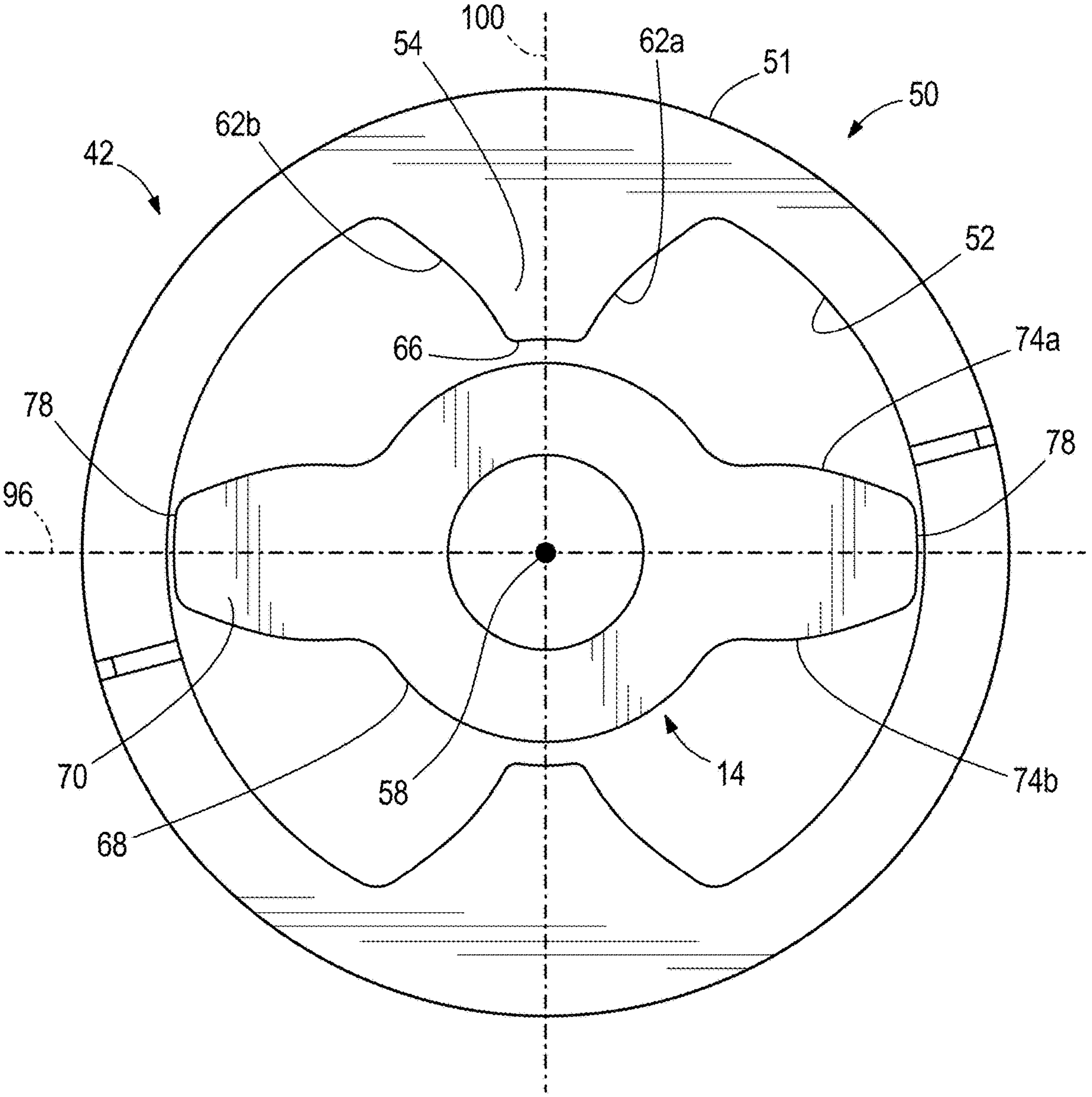
FIG. 3 is a cross-sectional view illustrating a drive assembly according to an embodiment of the present disclosure.
Figure 4:
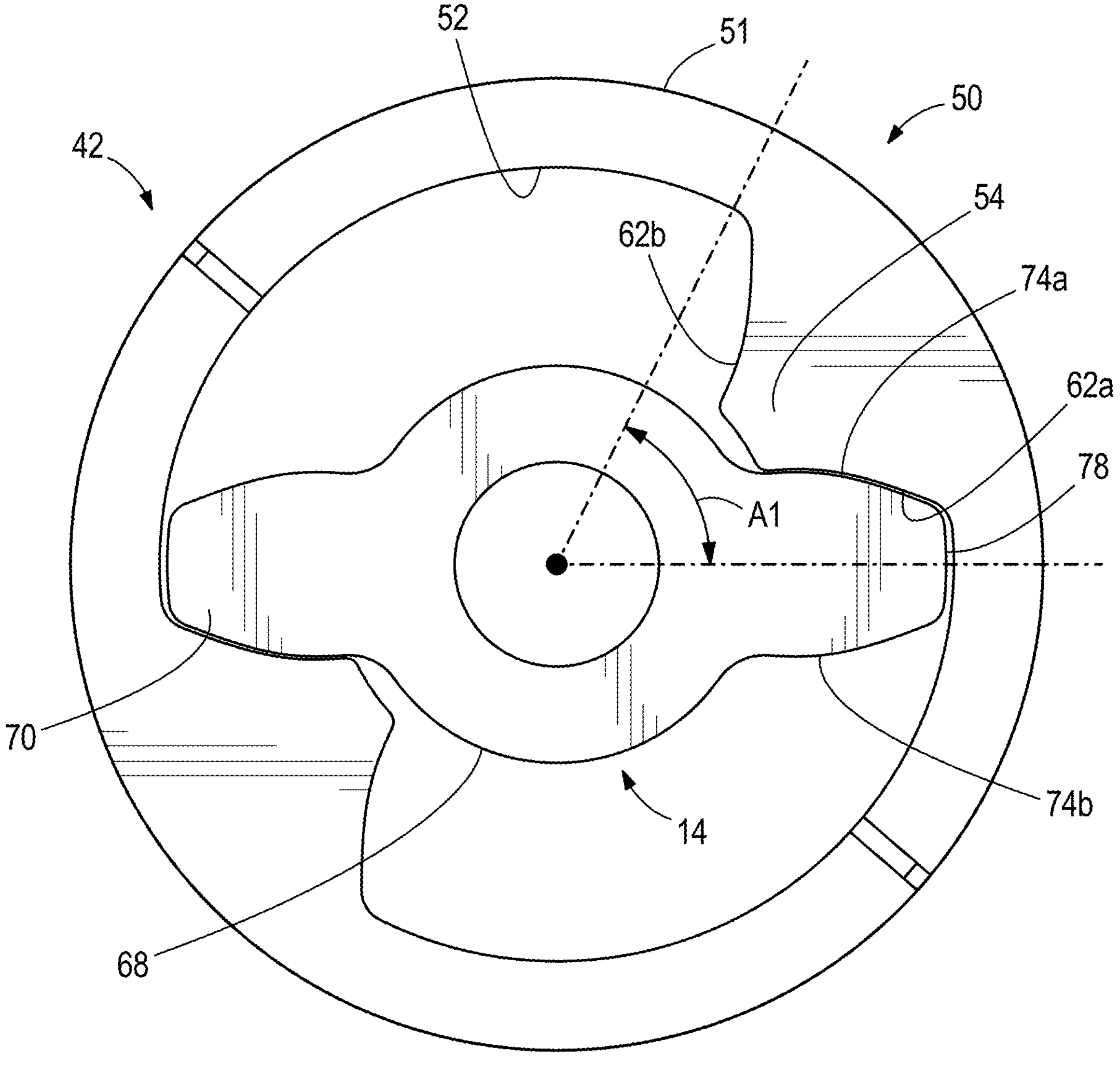
FIG. 4 is a cross-sectional view of the drive assembly of FIG. 3, at a moment of impact between a hammer and an anvil of the drive assembly.

Referring to FIGS. 3 and 4, the hammer 50 includes a body 51 having an inner surface 52 and a pair of hammer lugs 54 extending inwardly from the inner surface 52 in a direction toward the rotational axis 58. The illustrated pair of hammer lugs 54 oppose each other. Each of the hammer lugs 54 includes a first drive surface 62*a*, a second drive surface 62*b* on an opposite side of the hammer lug 54 as the first drive surface 62*a*, and a distal end 66 interconnecting the first and second drive surfaces 62*a*, 62*b*. The distal end 66 may be flat, arcuate, or curved. As will be described in greater detail below, the respective first drive surfaces 62*a* of the hammer lugs 54 may be employed during clockwise rotation, or a forward direction of rotation of the hammer 50 and the anvil 14, while the respective second drive surfaces 62*b* of the hammer lugs 54 may be employed during counter-clockwise rotation, or a reverse direction of rotation of the hammer 50 and the anvil 14. Alternatively, the hammer 50 may include only a single hammer lug 54, or more than two hammer lugs 54. Furthermore, in an embodiment of the impact wrench incorporating a non-reversible motor, each of the drive lugs need only include a single drive surface.

With continued reference to FIGS. 3 and 4, the anvil 14 includes a main body or root 68 and a pair of anvil lugs 70 extending from the root 68 in a direction away from the rotational axis 58. Each of the anvil lugs 70 includes a first driven surface 74*a*, a second driven surface 74*b* on an opposite side of the anvil lug 70 as the first driven surface 74*a*, and a distal end 78 interconnecting the first and second driven surfaces 74*a*, 74*b*. The first and second drive surfaces 62*a*, 62*b* of the hammer 50 are configured to strike the first and second driven surfaces 74*a*, 74*b* of the anvil 14, respectively, to transmit torque from the hammer 50 to the anvil 14. The distal end 78 may be flat, arcuate, or curved. As mentioned above, the respective first driven surfaces 74*a* of the anvil lugs 70 may be employed during clockwise rotation, or a forward direction of rotation of the hammer 50 and the anvil 14, while the respective second driven surfaces 74*b* of the anvil lugs 70 may be employed during counterclockwise rotation, or a reverse direction of rotation of the hammer 50 and the anvil 14.

The anvil 14 and the hammer 50 are each symmetrical in the illustrated embodiment. More specifically, an anvil plane 96 extends centrally through each anvil lug 70 and the rotational axis 58. As such, the anvil plane 96 contains the rotational axis 58. The anvil plane 96 defines a plane of symmetry of the anvil 14. A hammer plane 100 extends centrally through each hammer lug 54 and the rotational axis 58. As such, the hammer plane 100 contains the rotational axis 58. The hammer plane 100 defines a plane of symmetry of the hammer 50. In some embodiments, the anvil 14 and the hammer 50 are not symmetrical. As such, the anvil plane 96 may not define a plane of symmetry of the anvil 14, and the hammer plane 100 may not define a plane of symmetry of the hammer 50.

Figure 5:
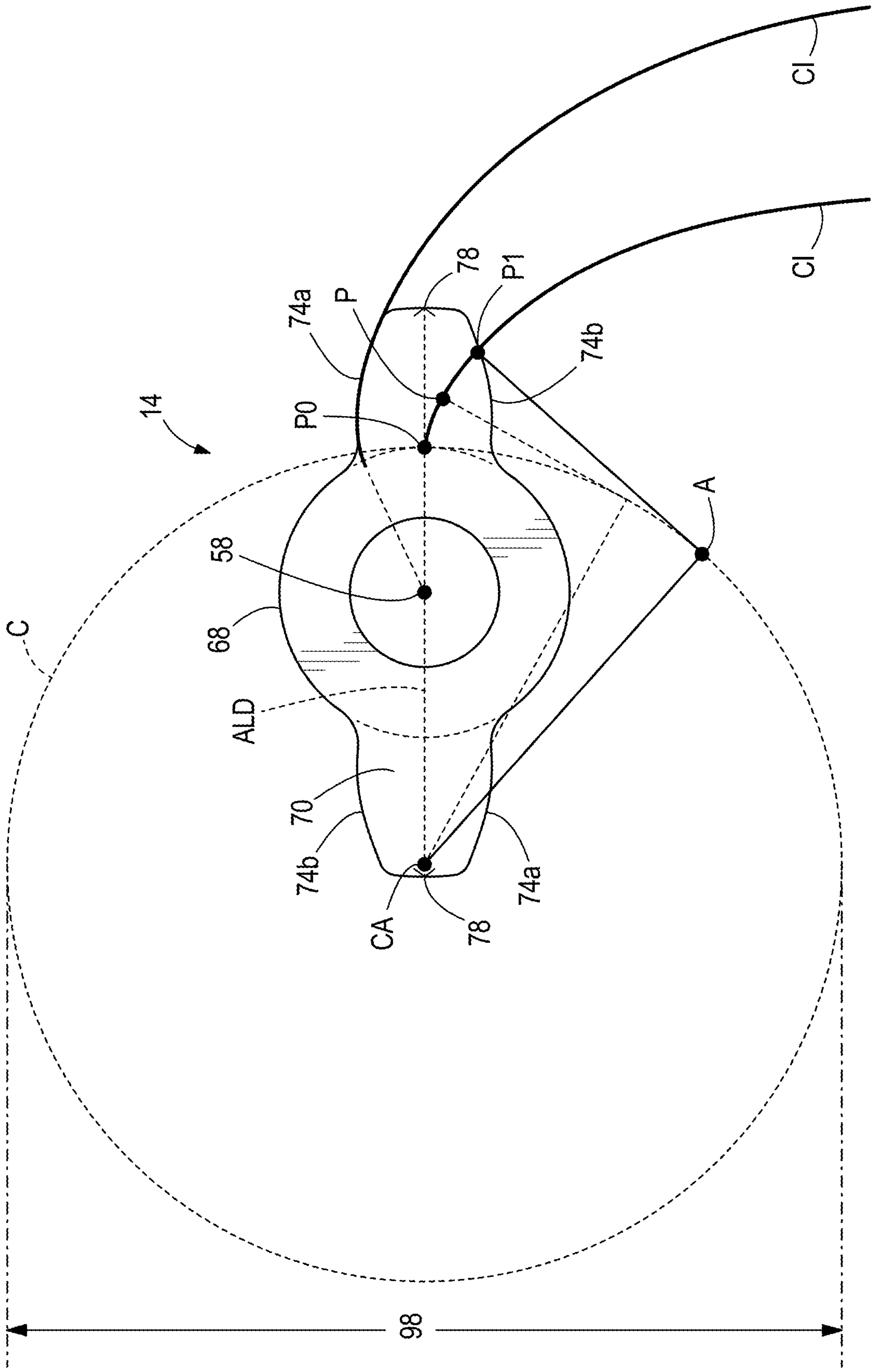
FIG. 5 is a schematic view of the anvil of the drive assembly of FIG. 3, illustrating the derivation of an involute profile on a driven surface of the anvil, the involute profile defined by a base cylinder offset from a rotational axis of the anvil.
Figure 6:
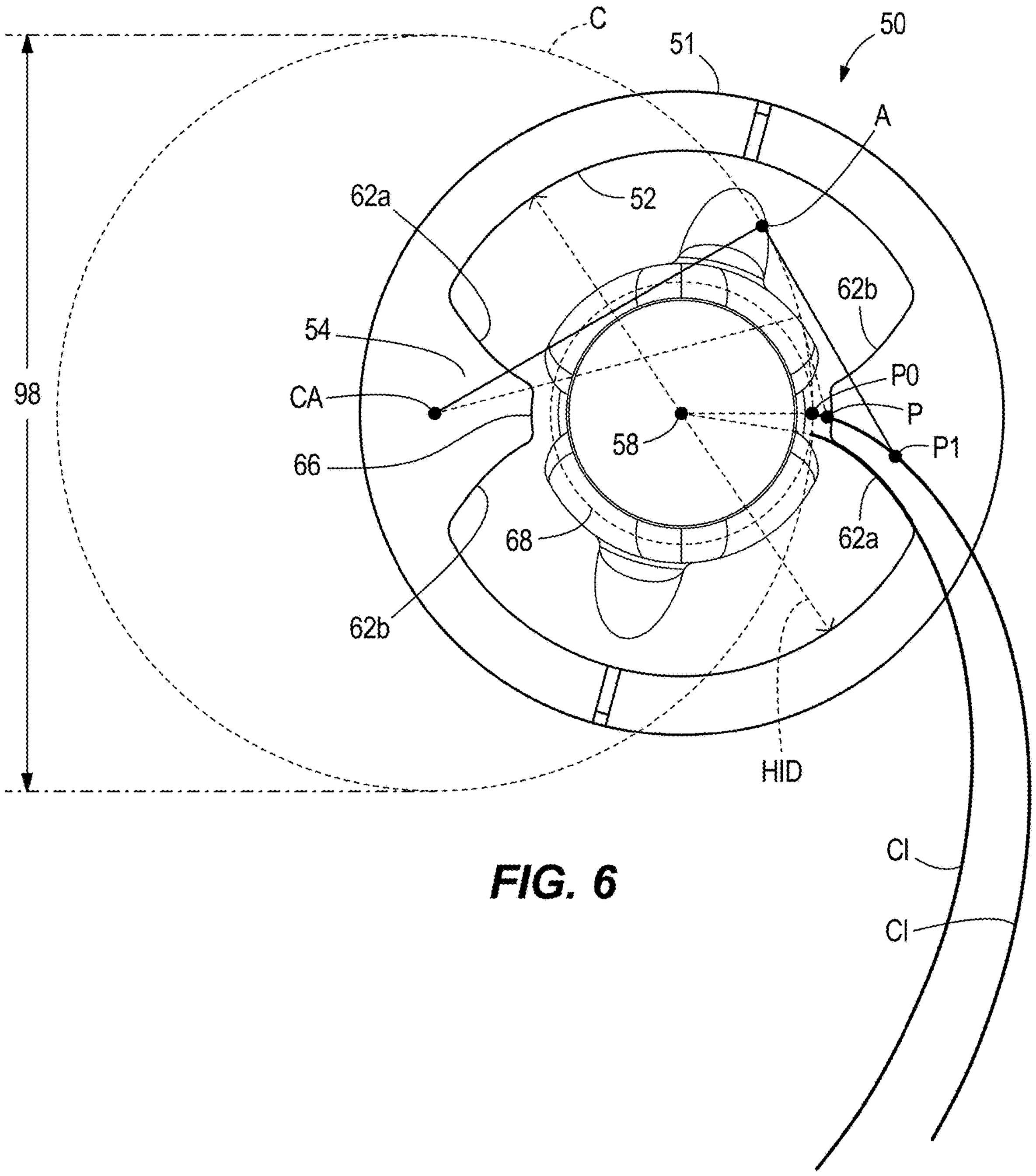
FIG. 6 is a schematic view of the hammer of the drive assembly of FIG. 3, illustrating the derivation of an involute profile on a drive surface of the hammer, the involute profile defined by a base cylinder offset from a rotational axis of the hammer.

In the illustrated embodiment of the drive assembly 42, each of the drive surfaces 62*a*, 62*b* of the hammer lugs 54 and each of the driven surfaces 74*a*, 74*b* of the anvil lugs 70 defines an involute profile. More particularly, the involute profile of each of the driven surfaces 74*a*, 74*b* of the anvil lugs 70, and each of the drive surfaces 62*a*, 62*b* of hammer lugs 54, is based upon or derived from a hypothetical base cylinder offset from the rotational axis 58 (e.g., hypothetical base cylinder C; FIGS. 5 and 6). The base cylinder C defines a central axis CA, which is offset from the rotational axis 58. With reference to FIG. 5, the curvature of the first driven surface 74*a* is traced by a point P (from P0 to P1) on an imaginary, taut thread or cord as it is unwound from the hypothetical base cylinder C in a clockwise direction, thereby generating an involute profile CI of the driven surface 74*a*. The illustrated involute profile CI is traced with the point P disposed on the anvil plane 96 (FIG. 3). The involute profile CI is then shifted in a counterclockwise direction on to the driven surface 74*a*. The involute profile CI of the second driven surface 74*b* is generated in a similar manner, except the imaginary, taut thread or cord is unwound from the hypothetical base cylinder C in a counterclockwise direction from the point of view of FIG. 5.

With reference to FIG. 6, the curvature of the first drive surface 62*a* is traced by the same point P (from P0 to P1) on the imaginary, taut thread or cord as it is unwound from the same hypothetical base cylinder C in a counterclockwise direction, thereby generating the involute profile CI of the first drive surface 62*a*. The illustrated involute profile CI is traced with the point P disposed on the hammer plane 100 (FIG. 3). The involute profile CI is then shifted in a clockwise direction on to the drive surface 62*a*. The involute profile CI of the second drive surface 62*b* is generated in a similar manner, except the imaginary, taut thread or cord is unwound from the hypothetical base cylinder C in a clockwise direction from the point of view of FIG. 6. The line A-P1 (FIGS. 5 and 6) is representative of the unwound length of the imaginary thread or cord, which is normal to a radius of the base cylinder C and the involute at the point P1. Although the unwound length of the imaginary thread or cord continuously increases, it remains normal to the radius of the base cylinder C and the involute throughout the unwinding process.

In embodiments in which the anvil 14 and the hammer 50 are not symmetrical, the drive surfaces 62*a*, 62*b* of the hammer lugs 54 and the driven surfaces 74*a*, 74*b* of the anvil lugs 70 define an asymmetric involute profile. The hammer lugs 54 may be asymmetric about the hammer plane 100. The anvil lugs 70 may be asymmetric about the anvil plane 96. The curvature of the drive and driven surfaces 62*a*, 62*b*, 74*a*, 74*b* may be traced using a similar method as previously discussed. However, for example, the drive surfaces 62*a*, 62*b* may not be traced using the same hypothetical base cylinder C. Instead, the first drive surface 62*a* is traced from a first hypothetical base cylinder having a first diameter, and the second drive surface 62*b* is traced from a second hypothetical base cylinder having a second diameter different than the first diameter. The driven surfaces 74*a*, 74*b* may similarly be traced from hypothetical base cylinders having different diameters. In some embodiments, the different sized base cylinders may both be concentric with the rotational axis 58. In other embodiments, the different sized base circles may be concentric with each other but not with the rotational axis 58. In yet other embodiments, the different sided base circles may not be concentric with each other nor the rotational axis 58.

With reference to FIGS. 5 and 6, the central axis CA of the base cylinder is offset from the rotational axis 58 of the drive assembly 42. The illustrated central axis CA is offset from the rotational axis 58 in a first direction along the anvil plane 96 and the hammer plane 100, respectively. More specifically, the illustrated central axis CA is offset from the rotational axis 58 in a direction parallel to the anvil plane 96 and the hammer plane 100, respectively. In some embodiments, the central axis CA may be offset from the rotational axis 58 in a second direction perpendicular to the respective plane 96, 100. In other embodiments, the central axis CA may be offset from the rotational axis 58 in both the first direction and the second direction. The illustrated central axis CA extends through one of the anvil lugs 70 and hammer lugs 54. In some embodiments, the central axis CA may extend through a different portion of the anvil 14 and hammer 50. In other embodiments, the central axis CA may not extend through any portion of the anvil 14 or hammer 50.

With continued reference to FIGS. 5 and 6, the location of the central axis CA and a diameter 98 of the base cylinder C determine the shape of the involute profile. The central axis CA may be located at any position and the diameter 98 may be any value to achieve a desired involute profile of the drive and driven surfaces 62*a*, 62*b*, 74*a*, 74*b*. In some embodiments, the diameter 98 of the base cylinder C may be greater than an anvil lug diameter ALD defined by the distal ends 78 of the anvil lugs 70 (FIG. 5). Additionally or alternatively, the diameter 98 of the base cylinder C may be greater than a hammer inner diameter HID defined by the inner surface 52 of the body 51 of the hammer 50 (FIG. 6). The illustrated base cylinder C contacts the root 68 at a single point, which is the location of P0. In some embodiments, the base cylinder C may contact the root 68 at two points. In other embodiments, the base cylinder C may not contact the root 68.

Figure 7:
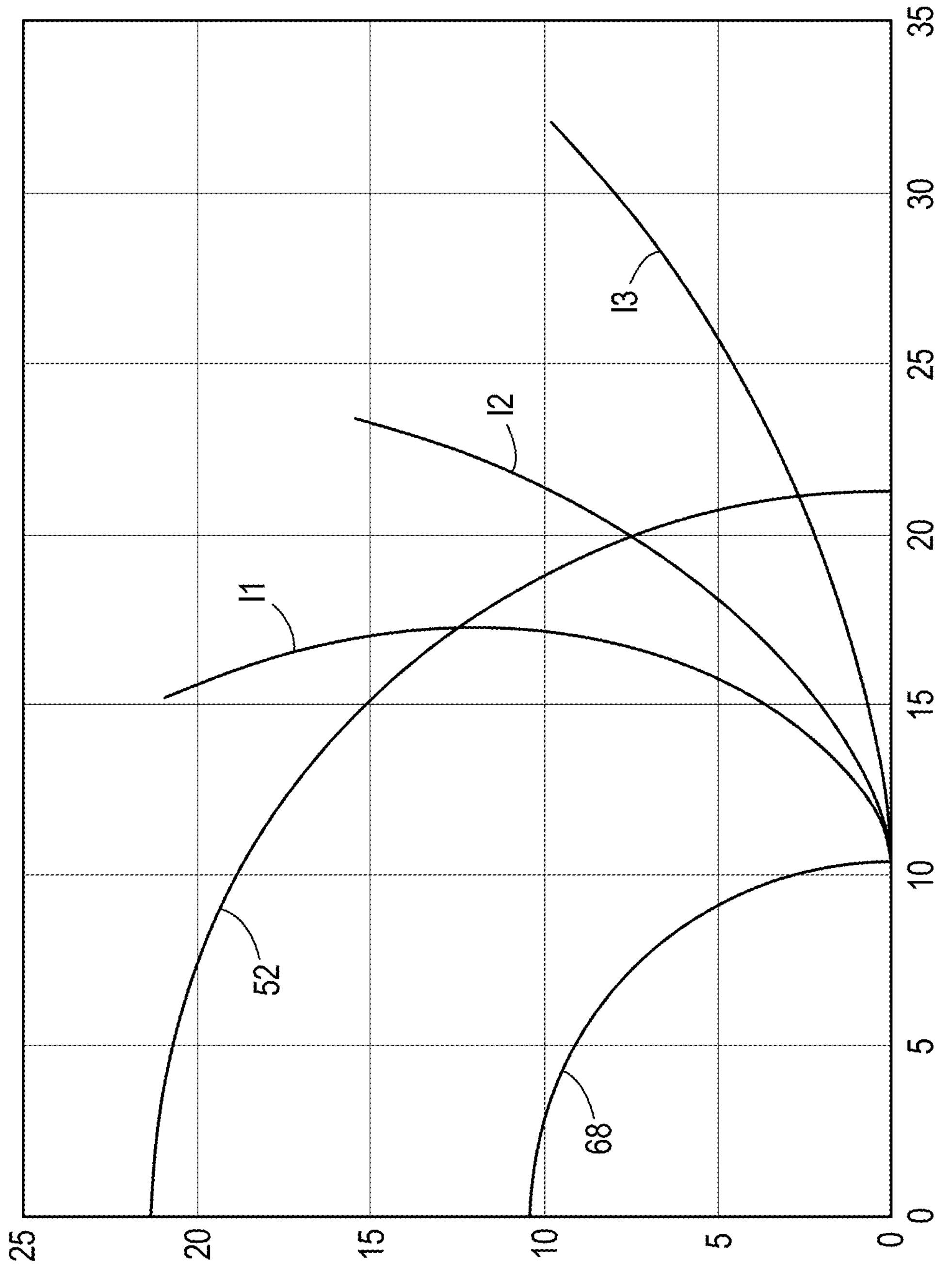
FIG. 7 is a chart illustrating different examples of involute profiles that may be incorporated into the anvil of FIG. 5 and/or the hammer of FIG. 6.

FIG. 7 illustrates a plurality of involute profiles, which are generated by the hypothetical base cylinder C. The root 68 and the hammer inner surface 52 are depicted to respectively define the lower and upper bounds of a length of the lugs 54, 70. The root 68 defines the lower bound, as the anvil lugs 70 originate at the root 68, and the drive assembly 42 would not be able to function if the hammer lugs 54 extended past the root 68. Similarly, the hammer inner surface 52 defines the upper bound, as the hammer lugs 54 originate at the inner surface 52, and the drive assembly would not be able to function if the anvil lugs 70 extended past the inner surface 52. The size of the root 68 and the inner surface 52 may be constrained by multiple factors (e.g., size of the housing 22, weight of the drive assembly 42, etc.). However, the base cylinder C is not constrained by these same factors, as it is hypothetical. As such, the base cylinder C may be offset relative to the rotational axis 58 to adjust the involute profile without adjusting the size of the root 68 or the hammer inner surface 52. The illustrated root 68 has a diameter of about 21 units (i.e., centimeters, inches, etc.) and the illustrated inner surface 52 has a diameter of about 42 units. The plurality of involute profiles includes a first involute profile I1, a second involute profile I2, and a third involute profile I3. The first involute profile I1 is generated by a first base cylinder (not shown) having a first base diameter (e.g., 24 units), the second involute profile I2 is generated by a second base cylinder (not shown) having a second base diameter greater than the first base diameter (e.g., 50 units), and the third involute profile I3 is generated by a third base cylinder (not shown) having a third base diameter greater than the second base diameter (e.g., 100 units). In other embodiments, an involute profile may be generated by a hypothetical base cylinder having a different diameter to achieve a desired involute profile. As seen in FIG. 7, the involute profiles I1, I2, I3 extend completely between the root 68 and the hammer inner surface 52. Said another way, the involute profiles I1, I2, I3 may be disposed along the entire length of the driven surfaces 74*a*, 74*b* of the anvil lugs 70 and the drive surfaces 62*a*, 62*b* of the hammer lugs 54.

The involute profile of each of the drive surfaces 62*a*, 62*b* and the driven surfaces 74*a*, 74*b*, among other things, facilitates a substantially uniform distribution of load across the entire length of each drive surface 62*a*, 62*b* when engaged to the respective driven surface 74*a*, 74*b*. Consequently, localized contact stresses between the hammer lugs 54 and the anvil lugs 70 are substantially reduced during operation of the impact wrench 10, thereby reducing wear of the hammer 50 and anvil 14, and increasing the useful life of the hammer 50 and anvil 14. In addition, because contact between the respective drive surfaces 62*a*, 62*b* and the driven surfaces 74*a*, 74*b* is substantially spread across the entire lengths of the respective drive surfaces 62*a*, 62*b* and the driven surfaces 74*a*, 74*b*, the overall mechanical efficiency of the impact wrench 10 is increased. Contact between the drive surfaces 62*a*, 62*b* and the driven surfaces 74*a*, 74*b* will have a "centering" effect on the anvil 14 during operation of the impact wrench 10 (i.e., the forces exerted by the hammer 50 on the anvil 14 tend to align the anvil 14 with the rotational axis 58), thereby further increasing the efficiency of the impact wrench 10.

In operation of the impact wrench 10 in a forward or clockwise direction of rotation, an operator depresses the switch 30 to electrically connect the motor 26 with a source of power to operate the motor 26 and drive the gear assembly 38 and the camshaft 46. As the hammer 50 co-rotates with the camshaft 46, the drive surfaces 62*a* of the hammer lugs 54 engage, respectively, the driven surfaces

74*a* of the anvil lugs 70 to provide an impact and to rotatably drive the anvil 14 and the tool element 18 in the selected clockwise or forward direction. After each impact, the hammer 50 moves or slides rearwardly along the camshaft 46, away from the anvil 14, so that the hammer lugs 54 disengage the anvil lugs 70. As the hammer 50 moves rearwardly, cam balls 82 (FIG. 2) situated in respective cam grooves 86 in the camshaft 46 move rearwardly in the cam grooves 86. A spring 90 stores some of the rearward energy of the hammer 50 to provide a return mechanism for the hammer 50. After the hammer lugs 54 disengage the respective anvil lugs 70, the hammer 50 continues to rotate and moves or slides forwardly, toward the anvil 14, as the spring 90 releases its stored energy, until the drive surfaces 62*a* of the hammer lugs 54 re-engage the driven surfaces 74*a* of the anvil lugs 70 to cause another impact. In operation of the impact wrench in a reverse or counter-clockwise direction of rotation, the drive surfaces 62*b* of the hammer lugs 54 engage the respective driven surfaces 74*b* of the anvil lugs 70 (FIG. 4), in a similar manner to that described above with reference to the forward or clockwise direction of rotation of the impact wrench 10.

In addition to reducing the localized contact stresses between the hammer lugs 54 and the anvil lugs 70, incorporating the involute profiles on the drive surfaces 62*a*, 62*b* on the hammer lugs 54 and the involute profiles on the driven surfaces 74*a*, 74*b* on the anvil lugs 70 also enhances the smoothness of operation of the impact wrench 10 by reducing a timing angle A1 during which the hammer 50 is retracted on the camshaft 46 and the hammer lugs 54 are passing over the anvil lugs 70. With continued reference to FIG. 4, the timing angle A1 is about 60 degrees. In other words, about 60 degrees of rotation of the hammer 50 is required, when in its retracted position along the camshaft 46 and rotating over the anvil 14, before the hammer 50 may be moved toward the anvil 14 by the spring 90 in preparation for the next strike or impact between the hammer lugs 54 and the anvil lugs 70. More particularly, using the orientation of the hammer 50 relative to the anvil 14 shown in FIG. 4 as a reference, in which the drive surface 62*b* and driven surface 74*b* are engaged, the hammer 50 traverses an angle A1 of about 60 degrees in a counterclockwise direction while in its retracted position along the camshaft 46 before the hammer 50 is allowed to resume its extended position to position the drive surface 62*a* adjacent the driven surface 74*a*. Alternatively, the anvil lugs 70 and/or the hammer lugs 54 may be sized having a reduced thickness from that shown in FIG. 4 to further reduce the timing angle A1.

Figure 8:
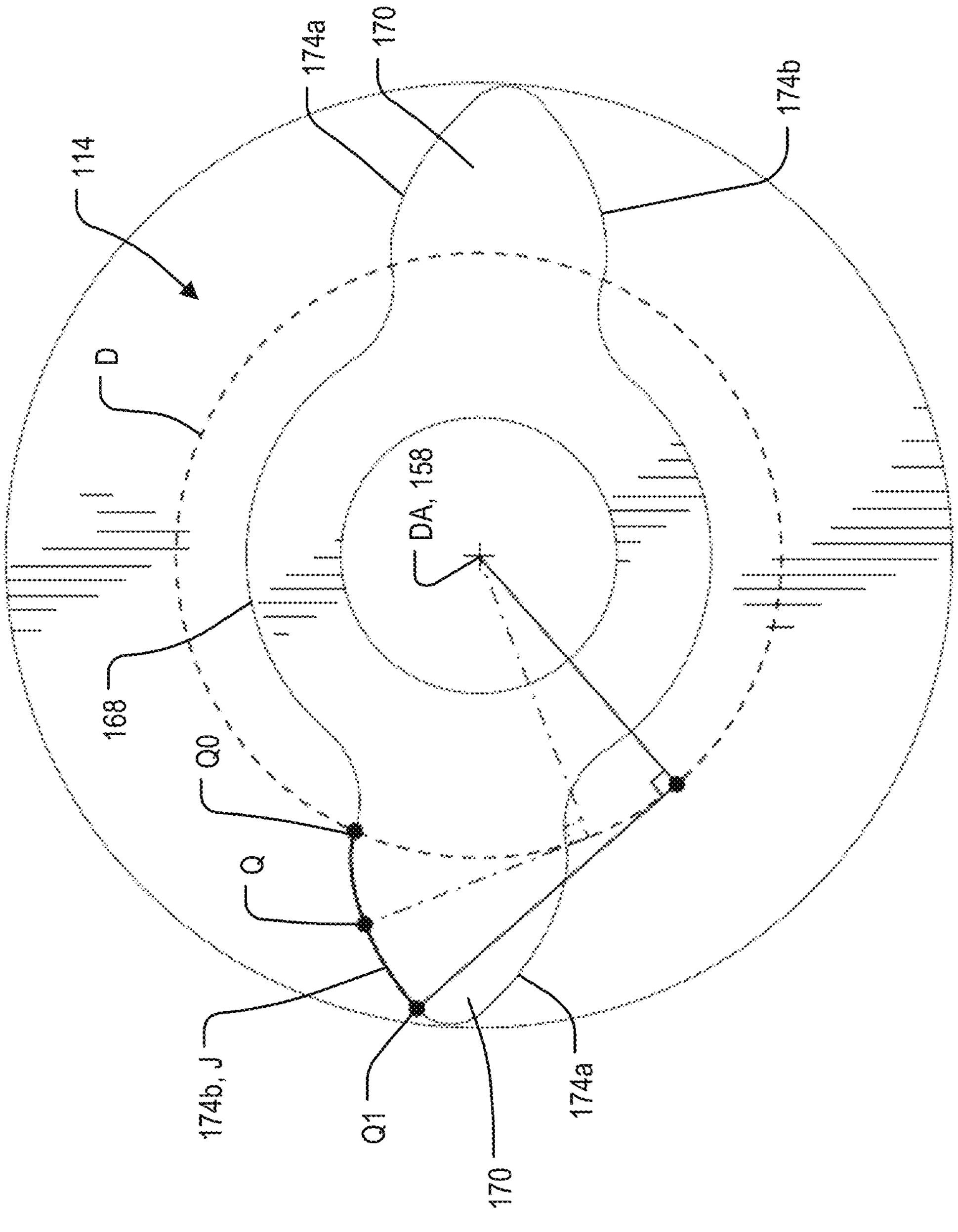
FIG. 8 PRIOR ART
FIG. 8 is a schematic of a prior art anvil, illustrating the derivation of an involute profile on a driven surface of the anvil and defined by a base cylinder centered on a rotational axis of the anvil.
Figure 9:
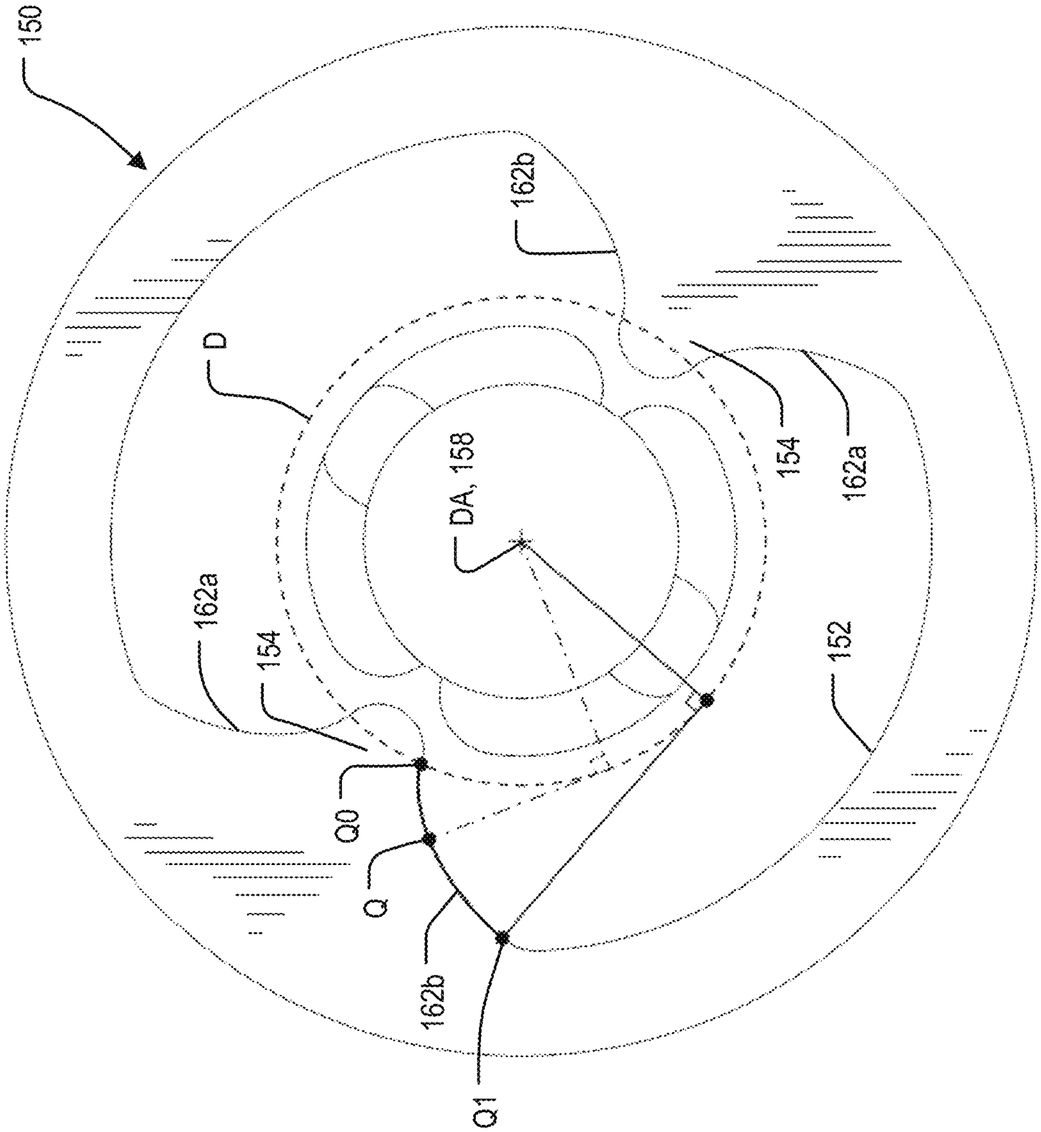
FIG. 9 PRIOR ART
FIG. 9 is a schematic of a prior art hammer, illustrating the derivation of an involute profile on a drive surface of the hammer and defined by a base cylinder centered on a rotational axis of the hammer.

FIGS. 8 and 9 illustrate an anvil 114 and a hammer 150 of the prior art. The anvil 114 and hammer 150 are rotatable about a rotational axis 158. The anvil 114 includes a root 168 and dual anvil lugs 170 extending from the root 168 in a direction away from the rotational axis 158. The anvil lugs 170 have driven surfaces 174*a*, 174*b*. The hammer 150 includes an inner surface 152 and dual hammer lugs 154 extending from the inner surface 152 in a direction toward from the rotational axis 158. The hammer lugs 154 have drive surfaces 162*a*, 162*b*. The driven and drive surfaces 174*a*, 174*b*, 162*a*, 162*b* include involute profiles, which are generated by a hypothetical base cylinder D. The curvature of the surfaces 174*a*, 174*b*, 162*a*, 162*b* are traced by a point Q (from Q0 to Q1), in the same way as the surfaces 74*a*, 74*b*, 62*a*, 62*b* are traced by the point P. The base cylinder D defines a central axis DA, which is the same as the rotational axis 158.

Figure 10:
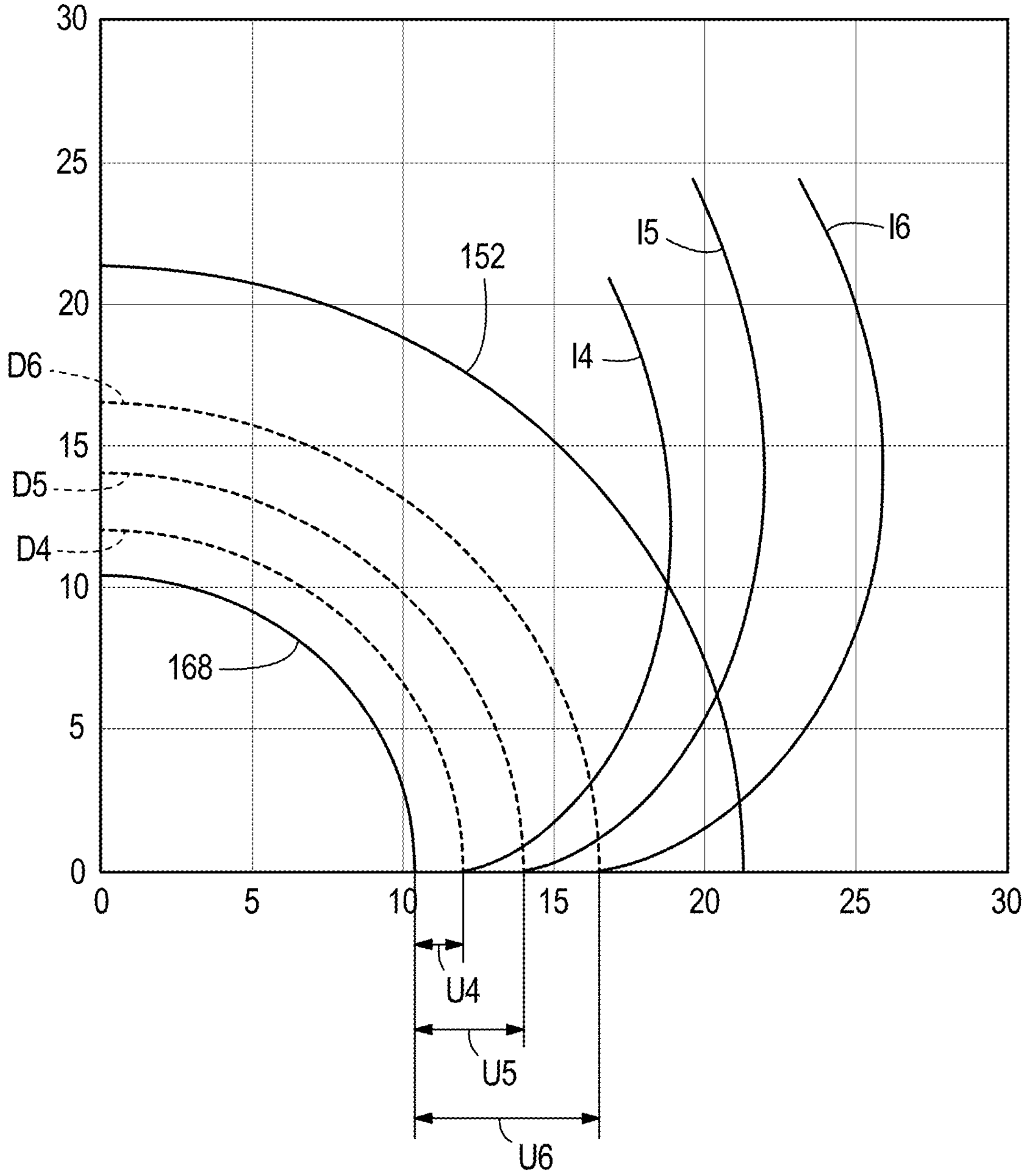
FIG. 10 is a chart illustrating different examples of involute profiles defined by a base cylinder centered on the rotational axis of the anvil of FIG. 8 and/or the hammer of FIG. 9.

FIG. 10 illustrates a plurality of involute profiles, which are generated by the hypothetical base cylinder D and the root 168. The lower bound (i.e., the root 168) and the upper bound (i.e., the hammer inner surface 152) of a length of the lugs 154, 170 are illustrated. The illustrated root 168 has a diameter of about 21 units, and the illustrated hammer inner surface 152 has a diameter of about 42 units. The root 168 and hammer inner surface 152 are illustrated as having the same diameters as the root 68 and hammer inner surface 52 from FIG. 7. The plurality of involute profiles includes a fourth involute profile I4, a fifth involute profile I5, and a sixth involute profile I6. The fourth involute profile I4 is generated by a fourth base cylinder D4 having a fourth base diameter (e.g., 24 units), the fifth involute profile I5 is generated by a fifth base cylinder D5 having a fifth base diameter greater than the fourth base diameter (e.g., 28 units), and the sixth involute profile I6 is generated by a sixth base cylinder D6 having a sixth base diameter greater than the fifth base diameter (e.g., 31 units). Because the illustrated cylinders D4, D5, D6 have diameters greater than the diameter of the root 168, the respective involute profiles I4, I5, I6 include unusable lengths. The fourth involute profile I4 includes an unusable fourth length U4, which is equal to the difference between the fourth base diameter and the diameter of the root 168 (i.e., about 3 units). The fifth involute profile I5 defines an unusable fifth length U5, which is equal to the difference between the fifth base diameter and the diameter of the root 168 (i.e., about 7 units). The sixth involute profile I6 defines an unusable sixth length U6, which is equal to the difference between the sixth base diameter and the diameter of the root 168 (i.e., about 10 units). The respective involute profiles I4, I5, I6 further include usable lengths defined between the hammer inner surface 152 and the respective base cylinders D4, D5, D6.

With continued reference to FIG. 10, base cylinders D4, D5, D6 with smaller diameters generate respective involute profiles with greater curvature. It is desired to have less curvature along the involute profile I4, I5, I6 on the driven and drive surfaces 174*a*, 174*b*, 162*a*, 162*b*, as this causes a pressure angle between the lugs 154, 170 to be lower. The lower pressure angle causes a lower radial component of force generated when the hammer impacts the anvil. The lower radial component of force creates less stress in the hammer and anvil lugs 154, 170. Said another way, it is desirable to maximize the diameter of the base cylinder D4, D5, D6. However, as illustrated in FIG. 10, base cylinders D4, D5, D6 with larger diameters cause the involute profiles I4, I5, I6 to have greater unusable lengths U4, U5, U6. It is undesirable to have unusable lengths along a drive or driven surface. The unusable lengths U4, U5, U6 are filled-in with linear or non-involute profiles. These filled-in lengths decrease the contact areas between the drive surfaces 162*a*, 162*b* and the driven surfaces 174*a*, 174*b*. The filled-in lengths further decrease the cross-section of the hammer lugs 154. Accordingly, there is a trade-off between a decreased in curvature and an increase in unusable length as the base diameter is increased. This trade-off exists when the central axis DA of the base cylinder D is the same as the rotational axis 158 of the anvil 114 and the hammer 150 (FIG. 8). As such, the base cylinder C being shifted relative to the rotational axis 58 of the anvil 14 and the hammer 50 is very advantageous (FIGS. 5 and 6). The shifted base cylinder C allows for maximized curvature and a minimized unusable length.

Figure 11:
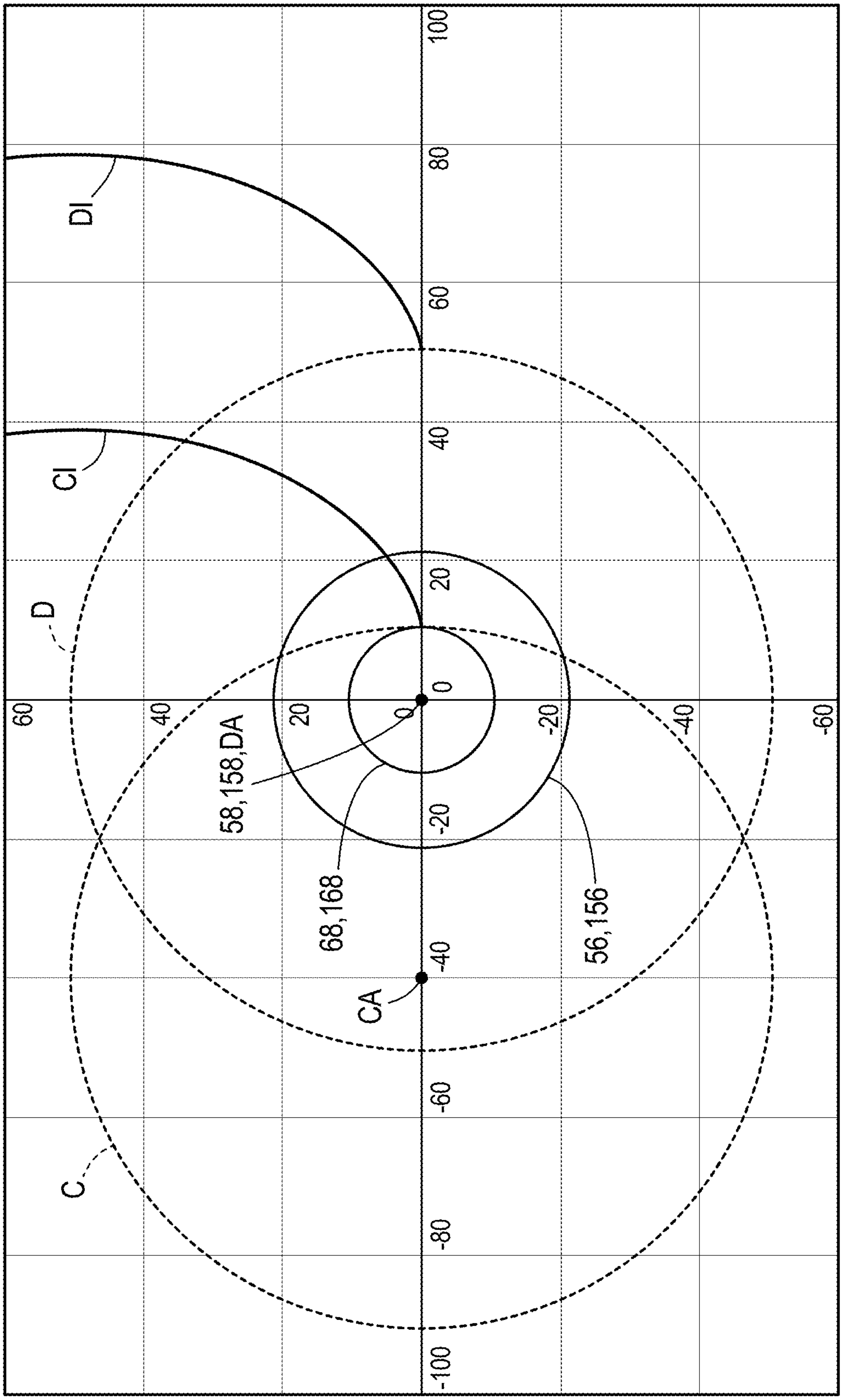
FIG. 11 is a chart comparing involute profiles embodying aspects of the present disclosure in which the base cylinder is shifted.

FIG. 11 illustrates a comparison between the base cylinder C and the base cylinder D. Both base cylinders C, D have a diameter equal to about 100 units. The lower bound (i.e., the root 68, 168) and the upper bound (i.e., the hammer inner surface 52, 152) of a length of the lugs 154, 170 are illustrated. The illustrated central axis CA of the base cylinder C is offset from the rotational axis 58, 158 by about 40 units, and the illustrated central axis DA of the base cylinder D is aligned with the rotational axis 58, 158. The base cylinder C generates the involute profile CI, and the base cylinder D generates the involute profile DI. Because the base cylinders C, D have the same diameter, the respective involute profiles CI, DI have the same curvature. The involute CI includes a usable length disposed originating at the lower bound and extending to the upper bound. As such, the involute profile CI may be disposed along the entire length of the drive surfaces 62*a*, 62*b* on the hammer lugs 50 and the driven surfaces 74*a*, 74*b* on the anvil lugs 70. The involute profile DI is unable to disposed along any portion of the drive surfaces 162*a*, 162*b* on the hammer lugs 154 or the driven surfaces 174*a*, 174*b* on the anvil lugs 170, because the involute profile DI originates outside of the upper limit. Accordingly, the benefit of shifting the central axis CA of the base cylinder C allows the base cylinder to have a large diameter (e.g., 100 units), which generates an involute profile with a low curvature, while still allowing the involute profile to be disposed along the entire length of the drive and driven surfaces 62*a*, 62*b*, 74*a*, 74*b*.

Various features and aspects of the present disclosure are set forth in the following claims.

What is claimed is:

1. An anvil configured to be impacted by a hammer in an impact wrench, the anvil defining a rotational axis, the anvil comprising:

an anvil lug including a driven surface engageable with the hammer, the driven surface including an involute profile, wherein the involute profile is formed by a base cylinder defining a central axis, wherein the central axis is offset from the rotational axis of the anvil, wherein the anvil lug is a first anvil lug, wherein the anvil further comprises a second anvil lug positioned opposite the first anvil lug, and wherein the anvil defines an anvil lug diameter from a distal end of the first anvil lug to a distal end of the second anvil lug, and wherein the base cylinder defines a base cylinder diameter, and wherein the base cylinder diameter is greater than the anvil lug diameter.

2. The anvil of claim 1, wherein the driven surface of the first anvil lug is a first driven surface, and wherein the first anvil lug further includes a second driven surface opposite the first driven surface.

3. The anvil of claim 2, wherein the anvil defines an anvil plane containing the rotational axis, and wherein the anvil is symmetrical about the anvil plane.

4. The anvil of claim 2, wherein the anvil defines an anvil plane containing the rotational axis, and wherein the central axis is offset from the rotational axis in a direction parallel to the anvil plane.

5. The anvil of claim 2, wherein the anvil defines an anvil plane containing the rotational axis, and wherein the central axis is offset from the rotational axis in a direction perpendicular to the anvil plane.

6. A hammer configured to impact an anvil in an impact wrench, the hammer defining a rotational axis, the hammer comprising:

a body having an inner surface defining a hammer inner diameter; and a hammer lug extending inwardly from the inner surface toward the rotational axis, the hammer lug including a drive surface engageable with the anvil, the drive surface including an involute profile, wherein the involute profile is formed by a base cylinder defining a central axis, wherein the central axis is offset from the rotational axis of the hammer, wherein the drive surface is concave, wherein the base cylinder defines a base cylinder diameter, and wherein the base cylinder diameter is greater than the hammer inner diameter.

7. The hammer of claim 6, wherein the hammer lug is a first hammer lug, and wherein the hammer further comprises a second hammer lug extending inwardly from the inner surface toward the rotational axis, the second hammer lug opposing the first hammer lug.

8. The hammer of claim 7, wherein the hammer defines a hammer plane containing the rotational axis, and wherein the hammer is symmetrical about the hammer plane.

9. The hammer of claim 8, wherein the central axis is offset from the rotational axis in a direction parallel to the hammer plane.

10. The hammer of claim 8, wherein the central axis is offset from the rotational axis in a direction perpendicular to the hammer plane.

11. A drive assembly for use in an impact wrench, the drive assembly comprising:

a hammer configured to rotate about a rotational axis, the hammer including a body having an inner surface defining a hammer inner diameter and a hammer lug extending inwardly from the inner surface toward the rotational axis, the hammer lug having a drive surface; and an anvil including an anvil lug, the anvil lug having a driven surface, wherein the drive surface of the hammer is configured to strike the driven surface of the anvil to transmit torque to the anvil, wherein the drive surface and the driven surface each include an involute profile formed by a base cylinder defining a base cylinder diameter, and wherein the base cylinder diameter is greater than the hammer inner diameter.

12. The drive assembly of claim 11, wherein the base cylinder defines a base cylinder axis, and wherein the base cylinder axis is offset from the rotational axis.

13. The drive assembly of claim 11, wherein:

the driven surface of the anvil lug is a first driven surface, the anvil lug includes a second driven surface opposite the first driven surface, the drive surface of the hammer is a first drive surface, and the hammer includes a second drive surface opposite the first drive surface.

14. The drive assembly of claim 13, wherein the first drive surface of the hammer lug is configured to engage the first driven surface of the anvil lug to drive the anvil in a first rotational direction, and wherein the second drive surface of the hammer lug is configured to engage the second driven surface of the anvil lug to drive the anvil in a second rotational direction opposite the first rotational direction.

15. The drive assembly of claim 14, wherein the hammer lug is a first hammer lug, and wherein the hammer further comprises a second hammer lug extending inwardly from the inner surface toward the rotational axis, the second hammer lug opposing the first hammer lug.

16. The drive assembly of claim 15, wherein the anvil lug is a first anvil lug, and wherein the anvil further comprises a second anvil lug opposite the first anvil lug.

17. The drive assembly of claim 16, wherein:
the hammer defines a hammer plane,
the hammer is symmetrical about the hammer plane,
the anvil defines an anvil plane, and
the anvil is symmetrical about the anvil plane.

* * * * *